United States Patent Office 2,882,338
Patented Apr. 14, 1959

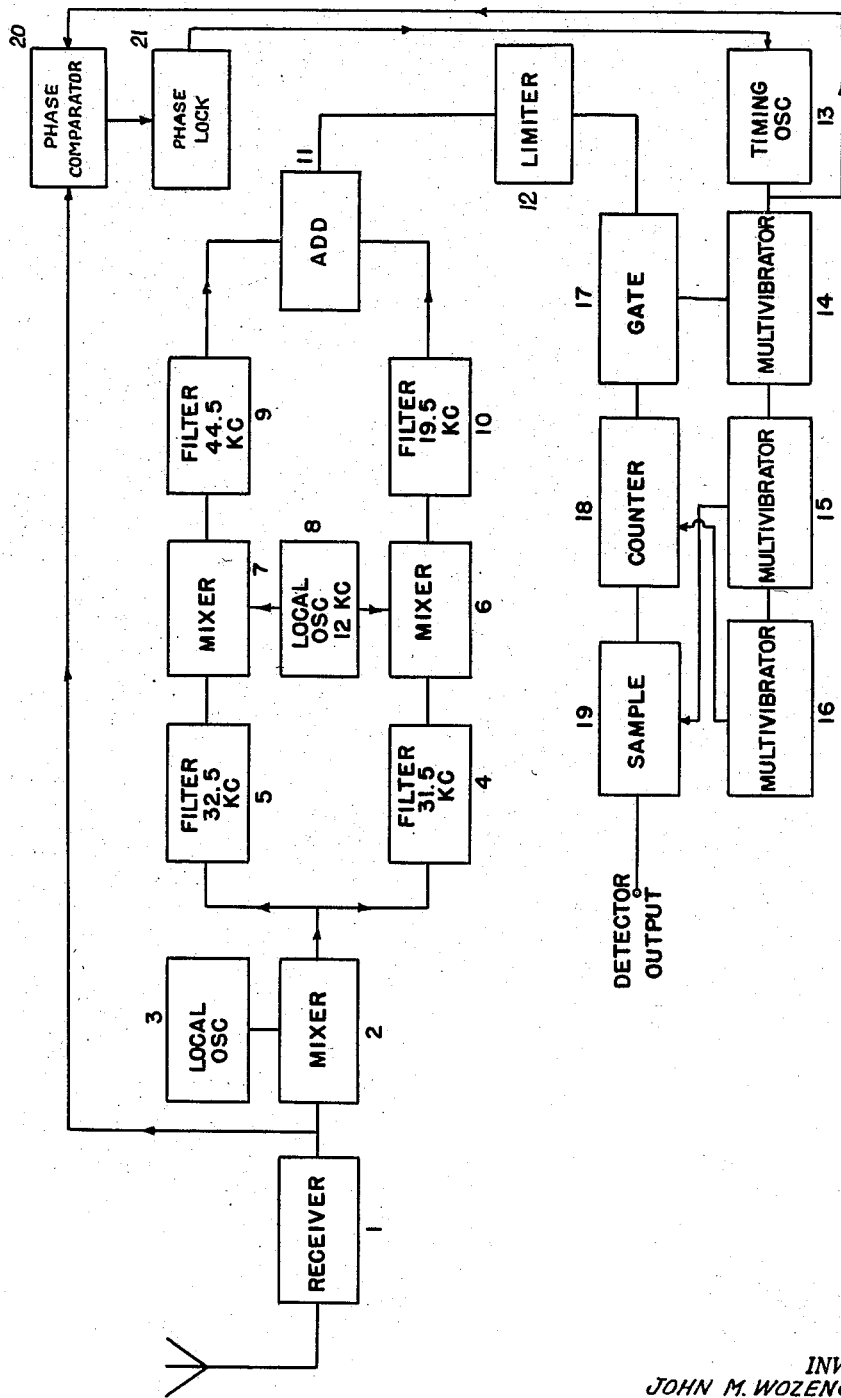

2,882,338

METHOD OF AND SYSTEM FOR DETECTING SIGNALS

John M. Wozencraft, Washington, D.C., assignor to the United States of America as represented by the Secretary of the Army Application March 17, 1955, Serial No. 495,076

3 Claims. (Cl. 178—69)

(Granted under Title 35, U.S. Code (1952), sec. 266)

The invention relates to a method of and a system for detecting signals of the pulse frequency-shift type.

Communication systems using pulses of the frequency-shift type are well known where the transmitted signal comprises a series of pulses which have a constant duration and a constant pulse repetition rate, but occur at different frequencies. This system may be used to obtain secrecy and consequently may be subjected to jamming signals as well as other usual interference.

The problem arising at the receiver then is to determine which of the known set of frequencies possible of transmission is the one most likely to have been transmitted as a particular code unit pulse.

This invention provides that this determination be made by gating a stage in the receiver for a small period during each code unit pulse and allowing the gated signal to pass into a counter after which the count is sampled in the detector where a determination is made as to what frequency was most probably transmitted as a particular code unit pulse.

Accordingly, an object of this invention is to provide an improved pulse frequency-shift type of receiver.

A further object is to provide a receiver capable of determining which of a known set of frequencies capable of having been transmitted is most likely to have been transmitted.

Referring now to the drawing where the figure is representative of a system capable of carrying out this invention, the transmitted signal may be received at 1 and beat with the output from local oscillator 3 in mixer 2 thus establishing an intermediate frequency. This intermediate frequency may be amplified, if desired, and fed into a bank of parallel filters 4 and 5, one tuned to each of the known possible transmitted frequencies after mixing which may, for example, be 31.5 kc. and 32.5 kc. More filters may be used if the transmitted signal contains more than two separate frequencies.

The filter outputs may be independently heterodyned in mixers 6 and 7 to new spectrum locations by local oscillator 8 which may for example be tuned to 12 kc. to provide a spacing $\Delta f$ between the final heterodyned frequencies. This spacing may be obtained by using the sum in one branch and the difference in the other branch. If additional channels are necessary, an additional local oscillator may be used so that all the frequencies will be equally spaced in the spectrum.

A second bank of filters 9 and 10 which may be tuned to 44.5 kc. and 19.5 kc. respectively then passes only the heterodyned signals in each channel to adder 11 where all the signals are added together to form a new composite signal. The composite signal may then be limited at 12 and differentiated, if necessary, in order to provide proper counter operation.

Timing oscillator 13 is operated in phase synchronization with the modulation of the transmitted signal and therefore has a period equal to the code unit pulse duration $T_0$. Code unit pulse synchronizing signals from receiver 1 and timing oscillator 13 are applied to phase comparator 20, which produces an output proportional to the phase difference between the applied signals. The output from phase comparator 20 is supplied to a phase lock system 21 which controls the frequency of the timing oscillator 13. The phase lock circuit might include a reactance tube or any other means of controlling the oscillator frequency and phase. Timing oscillator 13 keys multivibrators 14—16. Multivibrator 14 keys gate 17 "on" for a time period $\Delta t$ during each code unit pulse, where $\Delta t < T_0$, whereby the gated composite signal is allowed to pass into the binary counter chain 18.

At the end of the counting period a sampler 19 is keyed on by multivibrator 15 whereby a voltage output is obtained, the magnitude of which depends upon the tone of the particular code unit pulse being detected. Binary counter chain 18 is then reset to zero by multivibrator 16 in preparation for the detection of the next code unit pulse. Any other type of counter and sampler may be used, as the particular details described are merely illustrative of the counting and sampling processes encompassed by this invention.

If a frequency $f_1$ is fed into the counter 18 for $\Delta t$ seconds, then the registered count will be $f_1 \Delta t$. If another possible tone is $f_2$ which equals $f_1 + \Delta f$, then the count for that tone would be $f_2 \Delta t$ or $f_1 \Delta t + \Delta f \Delta t$.

In the detection process, after gate 17 has closed, the registered count is sampled for each code unit separately. Inasmuch as there may be some uncertainty in the overall signalling process, any count between the limits $$(f_1 + \tfrac{1}{2}\Delta f)\Delta t$$

and $(f_1 - \tfrac{1}{2}\Delta f)\Delta t$ is considered to have resulted from tone $f_1$. The detection process therefore results in a decision that the tone corresponding before heterodyning to $f_1$ is that most probably transmitted.

The spacing $\Delta f$ between the final heterodyned frequencies should be large compared to the reciprocal of the time duration $\Delta t$ which gate 17 is open. This is desirable so that several pulses may be sampled to provide greater accuracy in the counting process.

If the spectrum spacing $\Delta f$ of the individual frequencies is already sufficiently large when transmitted, the second local oscillator 8 and second bank of filters 9 and 10 may be omitted.

The above description and the figure of the accompanying drawing are indicative of merely one embodiment of the invention. However, it will be obvious to those skilled in the art that various changes, modifications and improvements may be made without departing from the spirit of the invention.

The invention described herein may be manufactured and used by or for the Government for governmental purposes, without payment to me of any royalty thereon.

I claim:

1. In a pulsed two frequency carrier shift communication system, a receiver for minimizing the effects of extraneous interference comprising converter means for reducing the carrier shift frequency to an intermediate frequency, a pair of channels having filter means in each channel for passing a selected frequency to respective channels, heterodyne means for producing a sum frequency in one channel and a difference frequency in the other channel, filter means included in said channels for passing said sum and difference frequencies, means for adding the output for each channel, a timing oscillator controlled to operate in synchronization with the pulse repetition rate, a plurality of delay multivibrators actuated by said timing oscillator, gating means coupled to said means for adding and actuated by one of said multivibrators for a predetermined interval, counter means coupled to said gating means whereby said signal is passed thru said gating means to said counter means upon closure of said gate, means actuated by a second multivibrator for resetting said counter to zero after the opening of said gate, means actuated by a third multivibrator for sampling the counter output for a predetermined time period.

2. A pulse frequency-shift receiver for determining the transmitted frequency in the presence of interference comprising means for receiving the incoming signal, a plurality of filter means for passing a particular frequency to a selected channel, means for adding the output of each channel, a timing oscillator operating in phase synchronization with the pulse repetition rate, gate means operated by said oscillator, counter means connected to said gate means, means feeding the pulsed frequency to said gate means, means connected to said oscillator for opening said gate for a period of time less than the pulse length so that said pulse is fed to said counter during said period, means for sampling the output of the counter at the end of said period, and means for resetting the counter to zero after said counter output is sampled.

3. A system for receiving and distinguishing between frequencies in a pulsed frequency shift communication system comprising two channels each including filter means for passing each frequency to a channel, heterodyning means for producing a sum frequency in one channel and a difference frequency in the other channel, means for adding the output of each channel, a counter, a gate connected to the counter, a timing oscillator adapted to be operated in synchronization with the reception of each pulse, said timing oscillator being connected to said gate to open said gate for a period of time shorter than the period of the pulse whereby an output from the counter is obtained which is proportional to the frequency being transmitted as a pulse.

References Cited in the file of this patent

UNITED STATES PATENTS

| | | |
|---|---|---|
| 2,400,574 | Rea et al. | May 21, 1946 |
| 2,405,597 | Miller | Aug. 13, 1946 |
| 2,623,948 | Hansen | Dec. 30, 1952 |
| 2,658,139 | Abate | Nov. 3, 1953 |
| 2,676,203 | Phelps | Apr. 20, 1954 |
| 2,677,104 | Chase | Apr. 27, 1954 |